United States Patent
Sikka et al.

(10) Patent No.: US 10,824,916 B2
(45) Date of Patent: Nov. 3, 2020

(54) WEAKLY SUPERVISED LEARNING FOR CLASSIFYING IMAGES

(71) Applicant: SRI International, Menlo Park, CA (US)

(72) Inventors: Karan Sikka, Lawrenceville, NJ (US); Ajay Divakaran, Monmouth Junction, NJ (US); Parneet Kaur, Westborough, MA (US)

(73) Assignee: SRI International, Menlo Park, CA (US)

( * ) Notice: Subject to any disclaimer, the term of this patent is extended or adjusted under 35 U.S.C. 154(b) by 148 days.

(21) Appl. No.: 16/126,748

(22) Filed: Sep. 10, 2018

(65) Prior Publication Data
US 2020/0082224 A1    Mar. 12, 2020

(51) Int. Cl.
*G06N 3/08* (2006.01)
*G06K 9/62* (2006.01)

(52) U.S. Cl.
CPC .......... *G06K 9/6263* (2013.01); *G06K 9/623* (2013.01); *G06K 9/627* (2013.01); *G06N 3/08* (2013.01)

(58) Field of Classification Search
CPC ...... G06K 9/6263; G06K 9/627; G06K 9/623; G06N 3/08
USPC ....... 382/100, 157, 155, 156, 159, 115, 118, 382/168, 173, 181, 190, 194, 197, 199, 382/206, 232, 254, 260, 274, 275; 706/15, 12, 44; 700/47, 48
See application file for complete search history.

(56) References Cited

U.S. PATENT DOCUMENTS

| | | | | |
|---|---|---|---|---|
| 9,811,765 | B2* | 11/2017 | Wang | G06N 3/08 |
| 10,528,572 | B2* | 1/2020 | Sacheti | G06F 16/48 |
| 2017/0060872 | A1* | 3/2017 | Sacheti | G06N 20/00 |
| 2018/0276727 | A1* | 9/2018 | Patel | G06Q 30/0625 |
| 2019/0034557 | A1* | 1/2019 | Alsallakh | G06N 3/0454 |

(Continued)

OTHER PUBLICATIONS

M. Oquab, et al., "Is object localization for free?—Weakly-supervised learning with convolutional neural networks"; Willow project, Departement d'Informatique de l'École Normale Supérieure, ENS/INRIA/CNRS UMR 8548, Paris, France; CVPR 2015 Paper; pp. 685-694.

(Continued)

*Primary Examiner* — Sheela C Chawan
(74) *Attorney, Agent, or Firm* — Moser Taboada

(57) ABSTRACT

Systems and methods for improving the accuracy of a computer system for object identification/classification through the use of weakly supervised learning are provided herein. In some embodiments, the method includes (a) receiving at least one set of curated data, wherein the curated data includes labeled images, (b) using the curated data to train a deep network model for identifying objects within images, wherein the trained deep network model has a first accuracy level for identifying objects, receiving a first target accuracy level for object identification of the deep network model, determining, automatically via the computer system, an amount of weakly labeled data needed to train the deep network model to achieve the first target accuracy level, and augmenting the deep network model using weakly supervised learning and the weakly labeled data to achieve the first target accuracy level for object identification by the deep network model.

20 Claims, 8 Drawing Sheets

(56) References Cited

U.S. PATENT DOCUMENTS

2019/0147297 A1* 5/2019 Rogers ................ G06K 9/6256
706/12

OTHER PUBLICATIONS

K. Sikka, et al., "Classification and weakly supervised pain localization using multiple segment representation"; Image Vis. Comput. (2014); http://dx.doi.org/10.106/j.imavis.2014.02.008; pp. 1-12.
B. Zhou, et al., "Learning Deep Features for Discriminative Localization"; CVPR 2016 Paper; pp. 2921-2929.

* cited by examiner

FIG. 3A
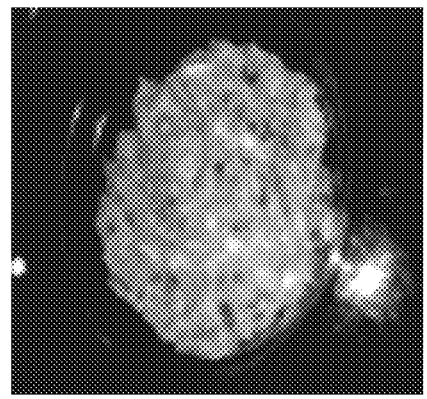
GUACAMOLE
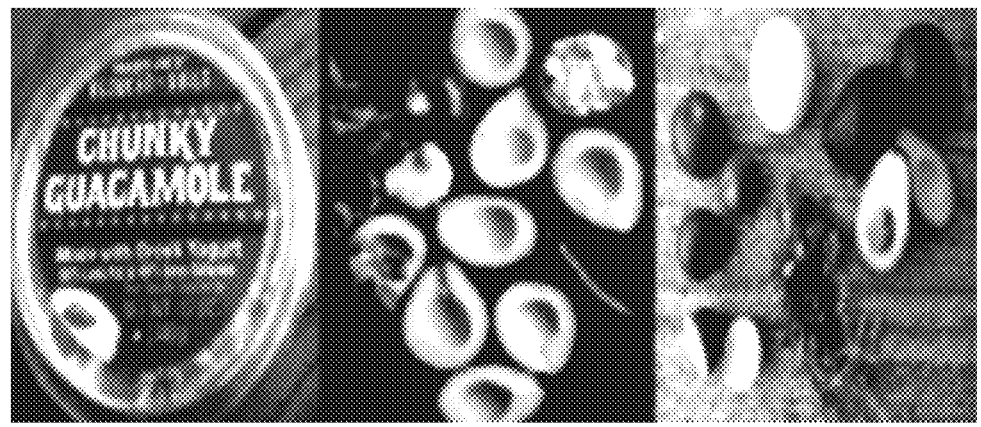
CROSS-DOMAIN NOISE
FIG. 3B
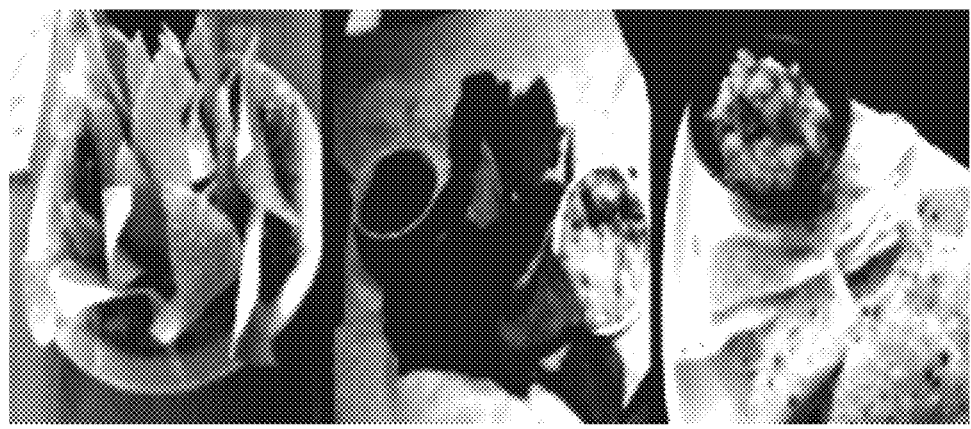
CROSS-CATEGORY NOISE
FIG. 3C

WEAKLY SUPERVISED LEARNING FOR CLASSIFYING IMAGES

FIELD

Embodiments of the present invention generally relate to image classification methods and systems, more particularly, to improving the accuracy of classifying images and objects within those images.

BACKGROUND

Image classification, and classifying objects within images, is a fine-grained classification problem. It is a challenging task due to the essentially limitless number of objects that can be found in an image. For example, even within a particular category of objects, such as food, high intra-class variation and low inter-class variation among different food classes exits. Further, in comparison to standard computer vision problems such as object detection and scene classification, present datasets for food classification are limited in both quantity and quality to train deep networks. Prior techniques to resolve this issue by collecting training data using human annotators or crowd-sourcing platforms to manually curate images and objects within those images. Paucity of labelled image data stymies machine learning algorithms that may be used to automatically classify images and objects within those images. Furthermore, manual curation (i.e., labeling/classification) of images and objects within those images is cost, time and scalability prohibitive. Such manual data curation is expensive and limits the scalability in terms of number of training categories as well as number of training samples per category. Moreover, it is challenging to label images for food classification tasks, for example, as they often have co-occurring food items, partially occluded food items, and large variability in scale and viewpoints. Accurate annotation of these images would require bounding boxes, making data curation even more time and cost prohibitive. Thus, it is important to build object datasets (e.g., food datasets) with minimal data curation so that they can be scaled for novel categories based on the final application.

Therefore, a need exists in the art for improved method and system for improving the accuracy of classifying images, and objects within those images, with minimal manual data curation.

SUMMARY

Systems and methods for improving the accuracy of a computer system for object identification/classification through the use of weakly supervised learning are provided herein. In some embodiments, the method includes (a) receiving at least one set of curated data, wherein the curated data includes labeled images, (b) using the curated data to train a deep network model for identifying objects within images, wherein the trained deep network model has a first accuracy level for identifying objects, receiving a first target accuracy level for object identification of the deep network model, determining, automatically via the computer system, an amount of weakly labeled data needed to train the deep network model to achieve the first target accuracy level, and augmenting the deep network model using weakly supervised learning and the weakly labeled data to achieve the first target accuracy level for object identification by the deep network model.

In some embodiments, a system for object identification/classification through the use of weakly supervised learning may include a first interface for receiving at least one weakly labeled image, a weakly supervised learning (WSL) computer system implemented in one or more computers configured to analyze the at least one weakly labeled image using a deep network model and weakly supervised learning to determine a feature map of the at least one weakly labeled image, wherein the WSL computer system includes a pre-trained deep network model configured to analyze the at least one weakly labeled image, a neural network layer configured to perform discriminative localization of objects within the at least one weakly labeled image, wherein performing discriminative localization of objects includes scoring each pixel within the at least one weakly labeled image, a spatial pooling module configured to return class-wise scores for each of the at least one weakly labeled image, and a loss function configured for use on the class-wise scores returned by the spatial pooling to compute cross-entropy loss for each of the at least one weakly labeled image.

In some embodiment, a method for improving the accuracy of a computer system for object identification/classification through the use of weakly supervised learning may include (a) receiving at least one weakly labeled image, (b) analyzing the at least one weakly labeled image using a deep network model and weakly supervised learning to determine a feature map of the at least one weakly labeled image, (c) using a neural network layer to perform discriminative localization of objects within the at least one weakly labeled image, wherein performing discriminative localization of objects includes scoring each pixel within the at least one weakly labeled image, (d) perform spatial pooling to return class-wise scores for each of the at least one weakly labeled image, (e) using a loss function on the class-wise scores returned by the spatial pooling to compute cross-entropy loss for each of the at least one weakly labeled image, and (f) determining a classification label for the at least one weakly labeled image based on at least one of the feature map, pixel scores, class-wise scores, and cross-entropy loss determined.

Other and further embodiments in accordance with the present principles are described below.

BRIEF DESCRIPTION OF THE DRAWINGS

So that the manner in which the above recited features of the present principles can be understood in detail, a more particular description of the principles, briefly summarized above, may be had by reference to embodiments, some of which are illustrated in the appended drawings. It is to be noted, however, that the appended drawings illustrate only typical embodiments in accordance with the present principles and are therefore not to be considered limiting of its scope, for the principles may admit to other equally effective embodiments.

FIGS. 3A-3C depict images of objects containing cross-domain noise in accordance with an embodiment of the present principles.

Figure 1:
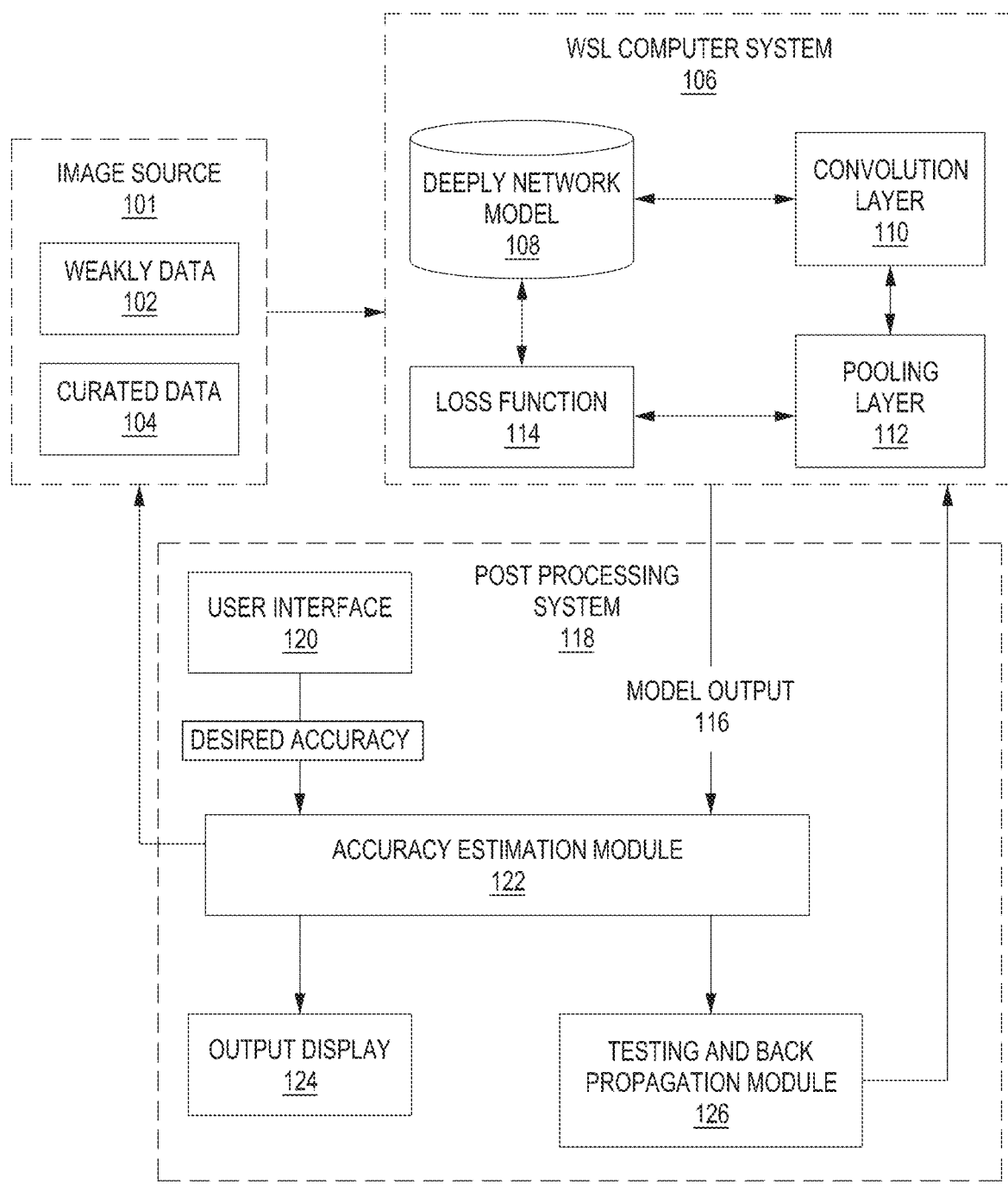
FIG. 1 depicts a high-level block diagram of an image classification system that uses weakly and webly supervised learning on weakly labeled images to improve image classification accuracy in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to methods, apparatuses and systems for image classification, and more particularly to improving the accuracy of classifying images and objects within those images. These embodiments capitalize on "weakly" and "webly" labeled data to augment curated data so as to boost the performance/accuracy of classifiers. Weakly or webly labeled data could be images that has not been curated and may contain no labels, or may be mis-labeled, or contain very generic labeling. This is sometimes referred to, and can include, noisy data. Embodiments of the invention enable systematic augmentation of manually curated data with webly/weakly labeled data which is plentiful and thus offers a way to get good classifier accuracy despite the shortage of curated data. Embodiments of the present invention advantageously improve the performance and efficiency of computer systems and computer vision applications. For example, social media analytics would benefit immensely from the ability to learn from a small curated dataset. Commercial applications of object or scene recognition such as driver assistance systems, handicapped people assistance systems, driverless cars, etc. would advantageously benefit from embodiments of the invention.

Embodiments of the present invention described below demonstrate that by sequentially adding manually curated data to the uncurated webly data from the Web, the classification accuracy increases from approximately 50% to over 70%, and in some cases to over 90%. To be able to use the webly data having weak labels, embodiments described below augment a deep learning model with Weakly Supervised learning (WSL) system, which increases the performance, accuracy and efficiency of classifying images, and objects within those images. The use of a deep learning model augmented with WSL also tackles the cross-category noise present in web images, and assists in identifying discriminative regions to disambiguate between fine-grained classes.

Figure 4A:
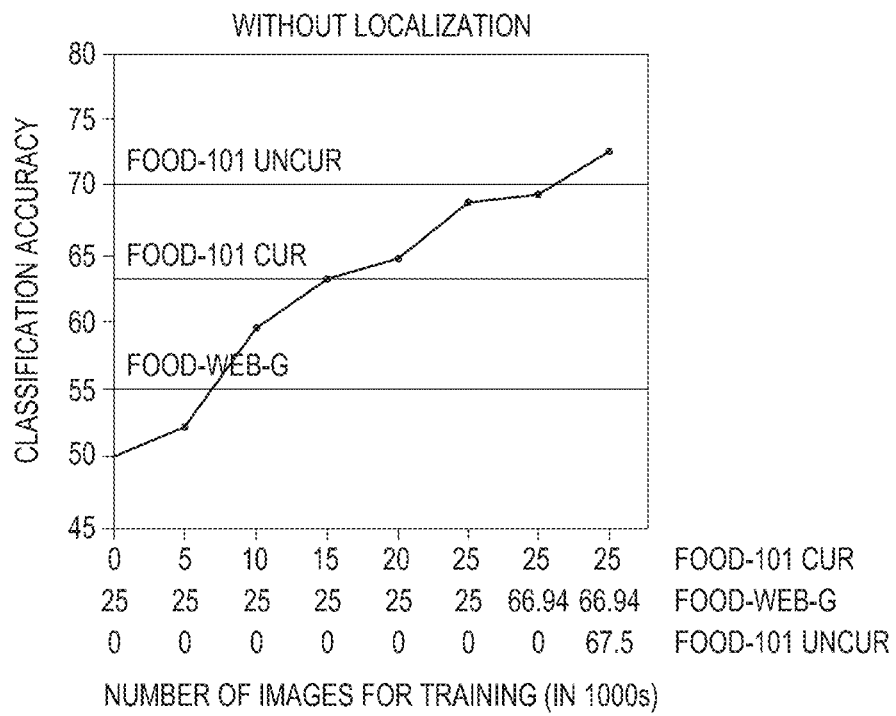
FIGS. 4A-4B depict the variation in performance on using different proportions of curated data and weakly labeled data in accordance with some embodiments of the present disclosure.
Figure 4B:
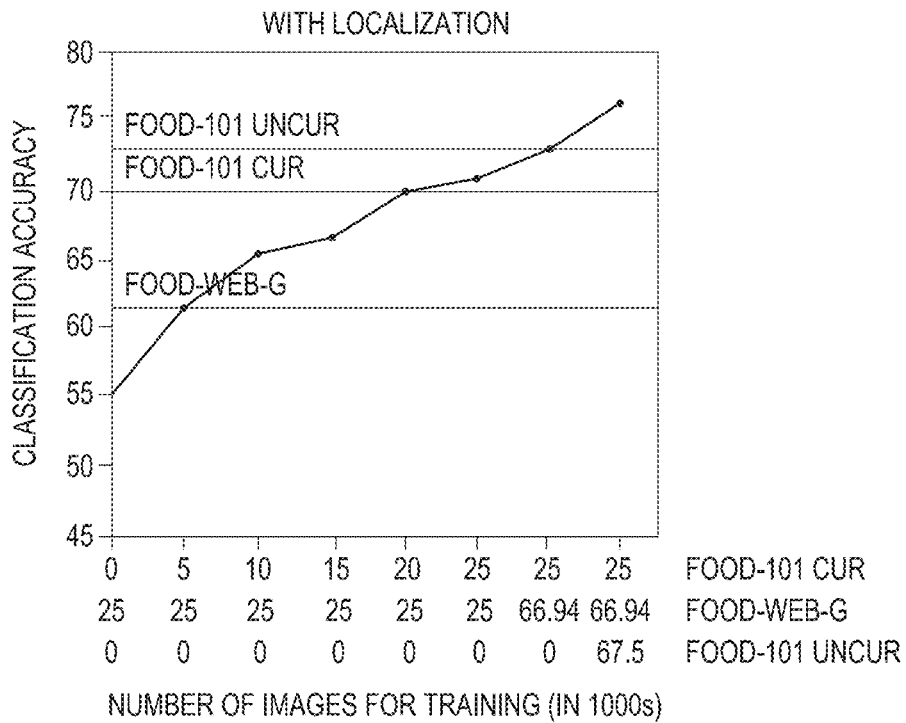

Furthermore, embodiments consistent with the present invention can determine the levels of uncurated weakly labeled data required to achieve a predetermined target level of accuracy and reduce the amount of curated data to achieve that level of accuracy. Specifically, as shown in FIGS. 4A and 4B and described further below, the relationship between the number of curated and uncurated data used along the bottom axis to achieve a certain level of accuracy shown along the right axis. Thus, the graph shows how each of these parameters is inter-related and the continuum they form. The accuracy determination modules and systems described below estimate the mixture of curated data and weakly labeled data required to achieve various levels of accuracy along this continuum. Persons having ordinary skill in the art recognize that the graphs depicted in FIGS. 4A and 4B are merely exemplary.

While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to visual concepts, such teachings should not be considered limiting. Embodiments in accordance with the present principles can be applied to any visual element or audio concepts and other such concepts as described herein. Those visual or audio elements can include images and audio that depicts Scenes, Objects, Concepts, Activities and Sentiments (SOCAS).

Figure 2:
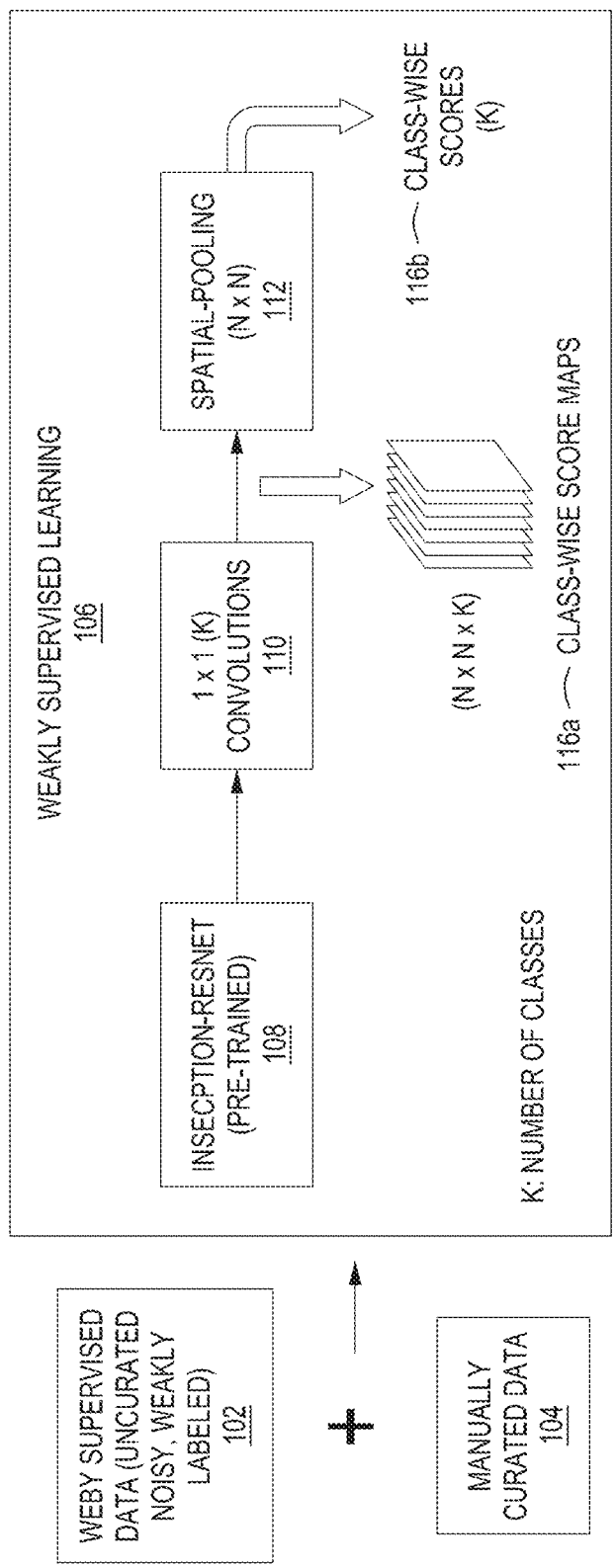
FIG. 2 depicts another high-level block diagram of an image classification system that uses weakly and webly supervised learning on weakly labeled images to improve image classification accuracy in accordance with an embodiment of the present principles.

FIGS. 1 and 2 depict high level block diagrams of embodiments of an image classification system 100 that are configured to classify images, improve the accuracy of classifying images and objects within those images using uncurated webly data, and determine the amount of uncurated data that is required to reach a desired accuracy level while minimizing the amount of curated data required.

The image classification system 100 includes a Weakly Supervised Learning (WSL) computer system 106 that receives a plurality of images from various image sources 101. Images often consist of multiple objects instead of a single object and require bounding boxes for annotation. To avoid expensive curation, weakly supervised learning (WSL) utilizes image level labels instead of pixel-level labels or bounding boxes. The image sources can include weakly labeled images/data 102 which are public images from sources such as, for example, GOOGLE, FLICKR, FACEBOOK, etc. that provide weakly labeled or other sources, such as user input or images from third party systems or devices. Furthermore, as opposed to data obtained by human supervision (i.e., manually curated dated 104), weakly data 102 is freely available in abundance but contains different types of noise. In addition, the image sources 101 can include manually curated images/data 104 from paid providers or other sources of manually curated data. The weakly data 102 and the curated data 104 the inputs to the WSL computer system 106 and used to train the system.

In some embodiments, the WSL computer system 106 is a deep convolutional neural network (CNN, or ConvNet). A CNN or ConvNet is a class of deep, feed-forward artificial neural networks, most commonly applied to analyzing visual imagery. In other embodiments, a Recurrent Neural Networks (RNN) that can take into account temporal aspects during prediction can be used. A CNN will learn to recognize patterns across space. That is, a CNN will learn to recognize components of an image (e.g., lines, curves, etc.) and then learn to combine these components to recognize larger structures (e.g., faces, objects, etc.). Meanwhile, an RNN will similarly learn to recognize patterns across time. The mechanism by which the two kinds of neural network layers represent image patterns is different, however. In the case of a CNN, it is looking for the same patterns on all the different subfields of the image. In the case of an RNN it is feeding the hidden layers from the previous step as an additional input into the next step. While the RNN builds up memory in this process, it is not looking for the same patterns over different slices of time in the same way that a CNN is looking for the same patterns over different regions of space. RNNs could be run on a single image for image captioning, for instance, and the meaning of "time" would simply be the order in which different parts of the image are processed. So, objects initially processed will inform the captioning of later objects processed.

As shown in FIG. 1, a deep network model 108 is combined with a convolution layer 110, pooling layer 112, and loss function module 114 to produce the WSL model output 116. In some embodiments, the output 116 of the WSL computer system may include, but is not limited to, image labels, object labels, features maps including the objects identified and their location within the images, class-wise scores, and class-wise score maps.

In some embodiments, the deep network model 108 is a pre-trained Inception-ResNet module as shown in FIG. 2, although other types of models may be used. As shown in FIG. 2, discriminative localization capabilities are incorporated into the deep model 108 (i.e., Inception-ResNet module) by adding a 1×1 convolution layer 110 and a spatial pooling layer 112 to form the pre-trained CNN/RNN. The convolution layer 110 generates N×N×K class-wise score maps 116a from previous activations, where K is the number of classes. The spatial pooling layer 112 in this architecture is a global average pooling layer which has been shown to outperform global max pooling methods for localization. Max pooling techniques only identify the most discriminative region by ignoring lower activations, while average pooling finds the extent of the object by recognizing all discriminative regions and thus giving better localization. The spatial pooling layer 112 returns class-wise scores 116b for each image which are then used to compute cross-entropy loss via loss function 114. During the test phase, heats maps for different classes are used to for visualization of the results by overlaying the predicted score maps on the original image.

As discussed above, in some embodiments, the deep model 108 may use Inception-ResNet as the base architecture and fine-tune the weights of a pre-trained network. In the Inception-ResNet module, residual connections allow shortcuts in the model to train even deeper neural networks, which have led to even better performance. This has also enabled significant simplification of the Inception blocks. In some embodiments, training of the model may be performed using an Adam optimizer with a learning rate $10^{-3}$ for the last fully-connected (classification) layer and $10^{-4}$ for the pre-trained layers. In some embodiments, batch sizes of 50 images may be used. For WSL, the CNN/RNN is initialized with the weights obtained by training the base model and only fine-tune the layers added for weak localization with learning rate of $10^{-3}$. For WSL, localized score maps are obtained for different classes by adding a 1×1 convolutional layer to map the input feature maps into classification score maps. For an input image of 299×299, a score map of 8×8 is obtained from the output of this convolutional layer, which gives approximate localization when resized to the size of input image. The average pooling layer is of size 8×8, stride 1 and padding 1.

As shown in FIG. 1, the output 116 from the WSL computer system 106 is input into the post processing system 118. As discussed above, the output 116 may include image labels, object labels, features maps including the objects identified and their location within the images, class-wise scores, class-wise score maps, and the like. An accuracy estimation module 122 analyzes the model output and determines an accuracy of the classification labels and/or feature maps created by the WSL computer system 106. In some embodiments, the determined/calculated accuracy may be displayed on output display 124. In some embodiments, a user interface 120 may be used to input a target/predefined accuracy. In some embodiments, the accuracy estimation module 122 will further determine the amount of uncurated data that is required to reach a desired accuracy level while minimizing the amount of curated data required. That information may also be displayed on output display 124. In some embodiments, the accuracy estimation module 122 may further include a controller which can automatically retrieve the additional amount of weakly data 102 needed to obtain the target accuracy provided while minimizing the amount of curated data 104 required. The post processing system 118 may also include a testing and back propagation module 126 to verify the accuracy of the classification labels and feed them back into the WSL computer system 106 to continually train the model and improve its performance and efficiency.

Embodiments in accordance with the present principles described with respect to FIGS. 1 and 2 above will be described below in specific use cases, such as for example, food identification, classification and categorization. However, persons having ordinary skill in the art would recognize that these use cases are non-limiting and exemplary and the principles described herein can be applied to any image/object classification applications.

Web images collected via search engines may include images including various objects. For example, in the use case of food categorization/identification, web images collected via search engines may include images of processed and packaged food items as well as ingredients required to prepare the food items as shown in FIGS. 3A-3B. This noise is referred to as cross-domain noise as it is introduced by the bias due to specific search engine and user tags. In addition, the web data may also include images with multiple food items while being labeled for a single food category (cross-category noise). For example, in images labeled as Guacamole, Nachos can be predominant (FIG. 2C). Further, the web results may also include images not belonging to any particular class.

In the food categorization use case described herein, food images were first collected from the web (i.e., weakly data 102) and augmented with both curated and additional uncurated images. The datasets collected are described below:
  1. Food-101: This dataset consists of 101 food categories with 750 training and 250 test images per category. The test data was manually curated whereas the training data consists of cross-category noise i.e. images with multiple food items labeled with a single class. The manually curated test data was used as the curated dataset (25 k images), Food-101-CUR, which is used to augment the web dataset. We use 10% of the uncurated training data for validation and 90% of uncurated data (referred to as Food-101-UNCUR) for data augmentation for training the deep model.

2. Food-Web-G: Web data was collected using public search engine image searches for food categories from Food-101 dataset. The restrictions on public search results limited the collected data to approximately 800 images per category. Images smaller than 256 pixels in height or width were removed from the dataset. As previously described, the web data is weakly labeled and consists of both cross-domain and cross-category noise as shown in FIGS. 3A-3C. We refer to this dataset as Food-Web-G.

3. UEC256: This dataset consists of 256 food categories, including Japanese and international dishes and each category has at least 100 images with bounding box indicating the location of its category label. Since this dataset provides the advantage of complete bounding box level annotations, this dataset was used for testing. The test set was constructed by selecting 25 categories in common with the Food-101 dataset and cropped images were extracted using the given bounding boxes.

The classification accuracy for different combinations of datasets with and without Weakly Supervised training are also shown in Table 1. The number of images for each combination (k=1000) and type of dataset (N: noisy and C: clean).

TABLE 1

Classification accuracy for different combinations of datasets.

| Dataset | No. of images | Type | w/o WSL | with WSL |
|---|---|---|---|---|
| Food-Web-G | 66.9k | N | 55.3% | 61.6% |
| Food-101-CUR | 25k | C | 63.3% | 64.0% |
| Food-101-UNCUR | 67.5k | N | 70.5% | 73.2% |
| Food-Web-G + Food-101-CUR | 92.5k | N + C | 69.7% | 73.0% |
| Food-Web-G + Food-101-UNCUR | 134.4k | N | 70.1% | 74.0% |
| Food-Web-UNCUR + Food-101-CUR | 92.5k | N + C | 71.4% | 75.1% |
| All datasets | 159.3k | N + C | 72.8% | 76.2% |

The performance without WSL is first discussed, where the baseline performance using public search images (Food-Web-G) is 55:3%. It is observed that augmenting Food-Web-G (66:9 k samples) with a small proportion of curated data (25 k samples) improves the performance to 69:7%, whereas augmentation with additional uncurated data (67:5 k samples from foodspotting.com) results in 70:1%. The performance of both combinations is higher compared to the curated data alone (63:3%) clearly highlighting the performance benefits of using weakly labeled web data. It is also observed that different sources of web images i.e. GOOGLE versus FOODSPOTTING.COM results in different performance (55:3% versus 70:5% respectively) for similar number of training samples. It should be noted that FOODSPOTTING.COM images are crowdsourced by food enthusiasts, who often compete for ratings, and thus has less cross-domain noise and better quality compared to general public search engine images. By combining all the three datasets, we observe a classification accuracy of 72:8%, which outperforms the performance obtained by either curated and uncurated datasets alone.

FIGS. 4A-4B show the variation in performance on using different proportions of clean and unclean images. More specifically, FIG. 4A depicts the classification accuracy using Inception Resnet and FIG. 4B depicts the classification Accuracy using Inception Resnet with localization layer. As the curated data (Food-101 CUR) is added to the web data, the classification accuracy on the test data (UEC256-test) increases. Increasing the web data results in further improvement. The horizontal line shows the baseline performance with individual datasets. Specifically, as shown in FIGS. 4A-4B, by sequentially adding manually curated data (Food-101 CUR) to the web data (Food-Web-G), the classification performance improves linearly from 50:3% to 69:0%. By adding the uncurated data from FOODSPOTTING.COM, it further increases to 72:8%. We also observe significant improvements by adding discriminative localization to the deep model, where the classification accuracy further increases to 76:2%. In particular we observe a consistent improvement across all data splits by using WSL e.g. for the combination of both uncurated datasets from public searches and FOODSPOTTING.COM, the hike in performance by using WSL is 4% absolute points. This performance trend highlights the advantages of WSL in tackling the noise present in food images by implicitly performing foreground segmentation and also focusing on the correct food item in the case when multiple food items are present (cross-category noise).

Figure 5A:
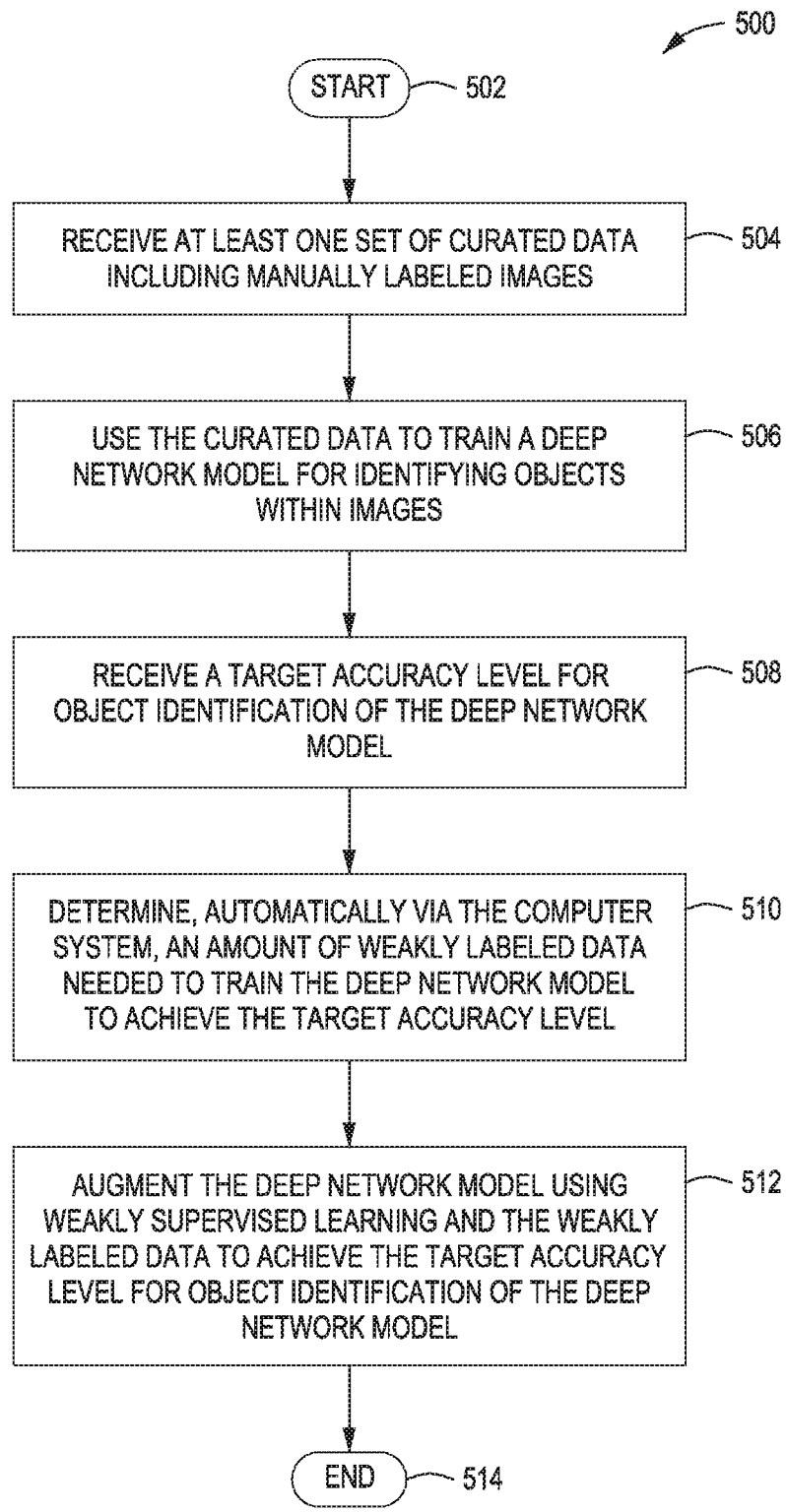
FIG. 5A-5B are flow diagrams of methods for image classification, and more particularly to improving the accuracy of classifying images and objects within those images in accordance with some embodiments of the present disclosure.

Referring now to FIG. 5A, a simplified flow diagram of a method 500 for improving the accuracy of a computer system for object identification/classification through the use of weakly supervised learning is described in accordance with some embodiments of the present disclosure.

The method 500 begins at 502 and proceeds to 504 where at least one set of curated data is received. The curated data may include manually labeled images, or images that are known to have been accurately labeled manually or automatically.

The method proceeds to 506 where the curated data is used to train the WSL computer system 106 and deep network model 108 using WSL to identify objects within images. The trained deep network model will produce a first accuracy level for identifying objects within images. The model 108 may first be trained using initial curated input data 104. In some embodiments, the model 108 may also be trained using at least some uncurated webly data as well.

At 508, a target accuracy level for object identification of the deep network model is received. This target accuracy level may be received via a user interface (e.g., user interface 120) or may be predefined as a default in the system. At 510, an amount of weakly labeled data needed to train the deep network model to achieve the target accuracy level is determined. This may be determined automatically by the accuracy estimation module 122 in FIG. 1 for example. In some embodiments, a second target accuracy level for identifying objects may be determined, calculated, or provided by a user.

At 512, the WSL computer system 106 and deep network model 108 are augmented using weakly supervised learning and the weakly labeled data) to achieve the target accuracy level for object identification by the deep network model. The method 500 ends at 514.

Figure 5B:
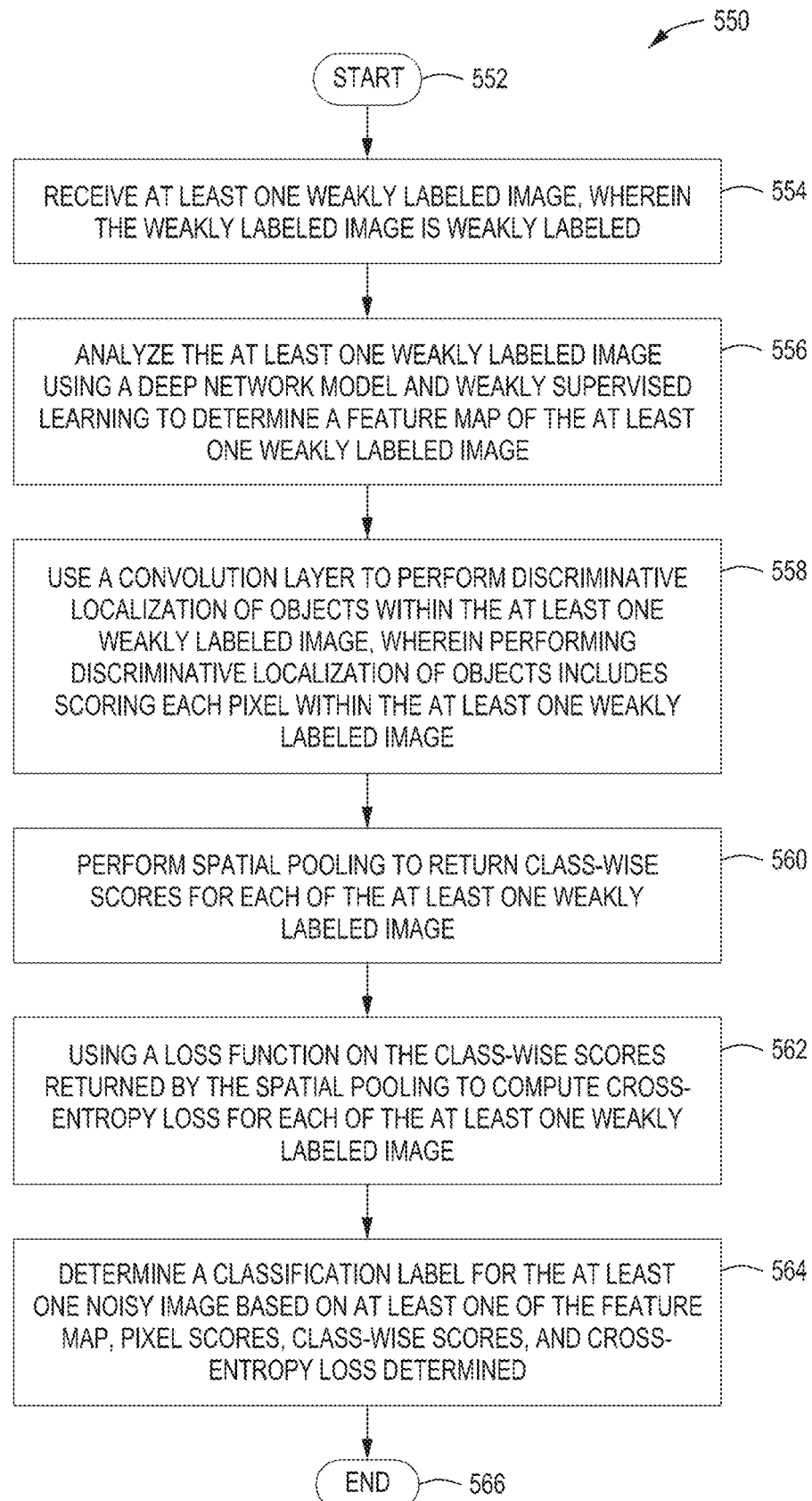

Referring now to FIG. 5B, a simplified flow diagram of a method 550 for determining a classification label for an object within an image using a WSL model is described in accordance with some embodiments of the present disclosure.

The method 550 begins at 552 and proceeds to 554 where at least one weakly labeled image is received. The method proceeds to 506 where the at least one weakly labeled image is analyzed using a deep network model and weakly supervised learning to determine a feature map of the at least one weakly labeled image. At 508, a convolution layer is used to perform discriminative localization of objects within the at least one weakly labeled image, wherein performing discriminative localization of objects includes scoring each pixel within the at least one weakly labeled image. At 510, spatial pooling is performed to return class-wise scores for each of the at least one weakly labeled image. At 512, a loss function is used on the class-wise scores returned by the spatial pooling to compute cross-entropy loss for each of the at least one weakly labeled image. Then, at 514, a classification label is determined for the at least one weakly labeled image based on at least one of the feature map, pixel scores, class-wise scores, and cross-entropy loss determined. The method 500 ends at 516.

Figure 6:
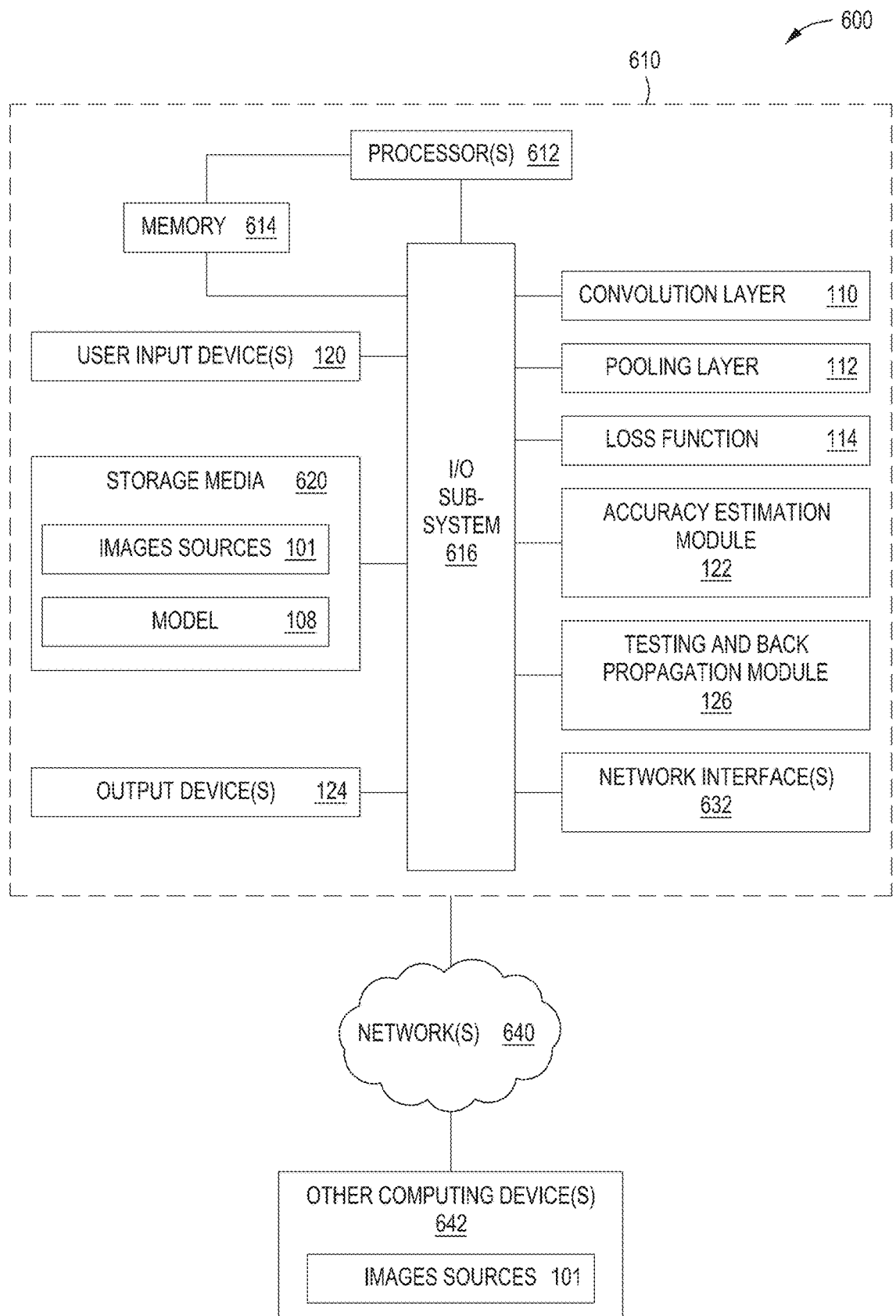
FIG. 6 depicts a high-level block diagram of a computing device in which the image classification system of FIG. 1 and flow chart of FIG. 5A can be implemented in accordance with an embodiment of the present principles.

Referring now to FIG. 6, a simplified block diagram of an exemplary computing environment 600 for the image classification system 100. The illustrative implementation 600 includes a computing device 610, which may be in communication with one or more other computing systems or devices 642 via one or more networks 640. In some embodiments, portions of the machine learning system 100 may be incorporated into other systems or interactive software applications or work with such systems or applications. Such applications or systems may include, for example, operating systems, middleware or framework (e.g., application programming interface or API) software, and/or user-level applications software (e.g., a search engine, a virtual personal assistant, a messaging application, a web browser, another interactive software application or a user interface for a computing device).

The illustrative computing device 610 includes at least one processor 612 (e.g. a microprocessor, microcontroller, digital signal processor, etc.), memory 614, and an input/output (I/O) subsystem 616. The computing device 610 may be embodied as any type of computing device such as a personal computer (e.g., a desktop, laptop, tablet, smart phone, wearable or body-mounted device, etc.), a server, an enterprise computer system, a network of computers, a combination of computers and other electronic devices, or other electronic devices. Although not specifically shown, it should be understood that the I/O subsystem 616 typically includes, among other things, an I/O controller, a memory controller, and one or more I/O ports. The processor 612 and the I/O subsystem 616 are communicatively coupled to the memory 614. The memory 614 may be embodied as any type of suitable computer memory device (e.g., volatile memory such as various forms of random access memory).

The I/O subsystem 616 is communicatively coupled to a number of components including one or more user input devices 120 (e.g., a touchscreen, keyboard, virtual keypad, microphone, etc.), one or more storage media 620, one or more output devices 124 (e.g., monitors, speakers, LEDs, etc.), one or more image sources 101, a convolution layer, 110, a pooling layer, 112, a loss function 114, an accuracy estimation module 122, a testing and back propagation module, and one or more network interfaces 632.

The storage media 620 may include one or more hard drives or other suitable data storage devices (e.g., flash memory, memory cards, memory sticks, and/or others). In some embodiments, portions of systems software (e.g., an operating system, etc.), framework/middleware (e.g., APIs, object libraries, etc.), images from images sources 101, and the model 108 and associated model features reside at least temporarily in the storage media 620. Portions of systems software, framework/middleware, images from images sources 101, and the model 108 and associated model may be copied to the memory 614 during operation of the computing device 610, for faster processing or other reasons.

The one or more network interfaces 632 may communicatively couple the computing device 610 to a network, such as a local area network, wide area network, personal cloud, enterprise cloud, public cloud, and/or the Internet, for example. Accordingly, the network interfaces 632 may include one or more wired or wireless network interface cards or adapters, for example, as may be needed pursuant to the specifications and/or design of the particular computing system 600. The network interface(s) 632 may provide short-range wireless or optical communication capabilities using, e.g., Near Field Communication (NFC), wireless fidelity (Wi-Fi), radio frequency identification (RFID), infrared (IR), or other suitable technology.

The other computing system(s) 642 may be embodied as any suitable type of computing system or device such as any of the aforementioned types of devices or other electronic devices or systems. For example, in some embodiments, the other computing systems 642 may include one or more server computers used to store portions of the model 108. In some embodiments, other computing system(s) 642 may be the WSL computer system 106. The computing system 600 may include other components, sub-components, and devices not illustrated in FIG. 6 for clarity of the description. In general, the components of the computing system 600 are communicatively coupled as shown in FIG. 6 by electronic signal paths, which may be embodied as any type of wired or wireless signal paths capable of facilitating communication between the respective devices and components.

Figure 7A:
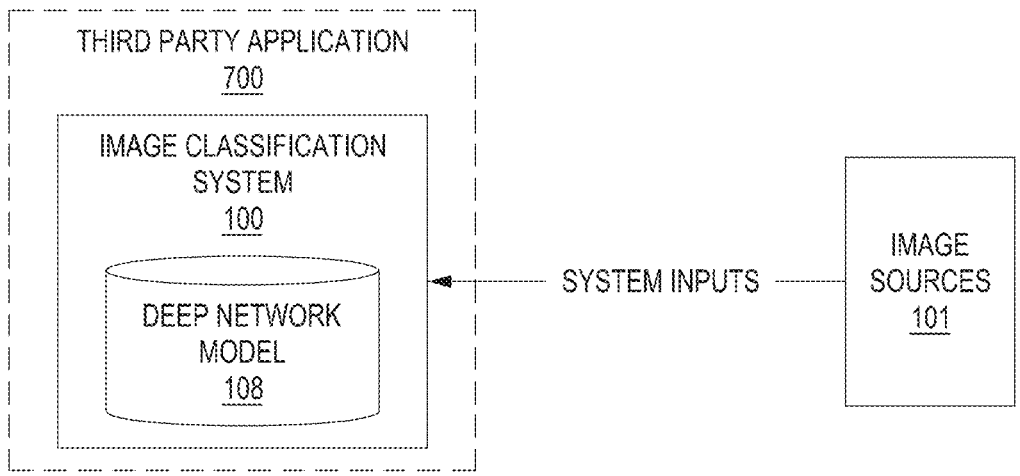
FIG. 7A depicts a high-level block diagram of a computing device in which the image classification system of FIG. 1 is shown as being a part of another system in accordance with an embodiment of the present principles.
Figure 7B:
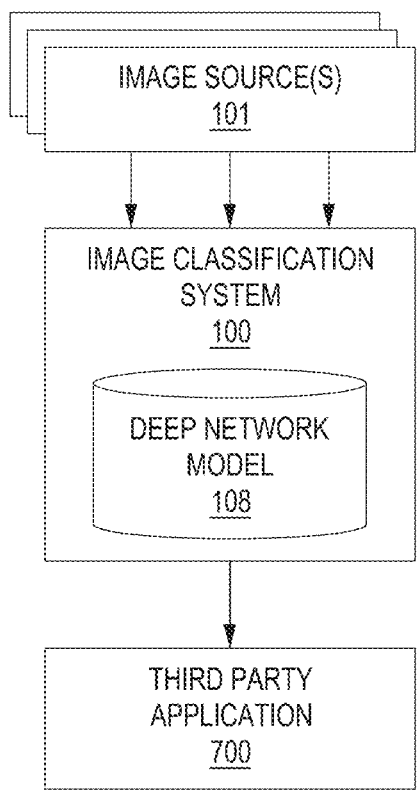
FIG. 7B depicts a high-level block diagram of a computing device in which the image classification system of FIG. 1 is shown as being connected to other systems in accordance with an embodiment of the present principles.

As described above, embodiments of the present invention advantageously improve the performance and efficiency of computer systems and computer vision applications. For example, social media analytics would benefit immensely from the ability to learn from a small curated dataset. Commercial applications of object or scene recognition such as driver assistance systems, handicapped people assistance systems, driverless cars, etc. would advantageously benefit from embodiments of the invention. FIGS. 7A and 7B depict high level block diagram of a computing device in which the image classification system of FIG. 1 is shown as being a part of another system, and in which the image classification system of FIG. 1 is shown as being a part of another system, respectively. As shown in FIG. 7A, a third party application/system 700 (e.g., such as a social media analytics application, driver assistance systems, handicapped people assistance systems, autonomous vehicle system, etc.) may include the image classification system 100, and associated components such as the deep network model 108, as being embedded, built into, otherwise a part of a third party application/system 700. In other embodiments as shown in FIG. 7B, the third-party application/system is externally connected to the image classification system 100.

In some embodiments, the level of accuracy desired/required would depend on the types of third party applications 700 that the image classification system 100 works with (i.e., different types of systems may need different levels of accuracy.) For example, social media analytics may not require the same high level of accuracy as would driver assistance systems, handicapped people assistance systems, or driverless cars, for example. Thus, the target accuracy level that may be requested by a social media analytics application and provided to the image classification system 100 may be lower than a target accuracy level that may be requested by a driver assistance system.

In the foregoing description, numerous specific details, examples, and scenarios are set forth in order to provide a more thorough understanding of the present disclosure. It will be appreciated, however, that embodiments of the disclosure may be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described may include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure may be implemented in hardware, firmware, software, or any combination thereof. Embodiments may also be implemented as instructions stored using one or more machine-readable media, which may be read and executed by one or more processors. A machine-readable medium may include any mechanism for storing or transmitting information in a form readable by a machine (e.g., a computing device or a "virtual machine" running on one or more computing devices). For example, a machine-readable medium may include any suitable form of volatile or non-volatile memory.

Modules, data structures, and the like defined herein are defined as such for ease of discussion and are not intended to imply that any specific implementation details are required. For example, any of the described modules and/or data structures may be combined or divided into sub-modules, sub-processes or other units of computer code or data as may be required by a particular design or implementation.

In the drawings, specific arrangements or orderings of schematic elements may be shown for ease of description. However, the specific ordering or arrangement of such elements is not meant to imply that a particular order or sequence of processing, or separation of processes, is required in all embodiments. In general, schematic elements used to represent instruction blocks or modules may be implemented using any suitable form of machine-readable instruction, and each such instruction may be implemented using any suitable programming language, library, application-programming interface (API), and/or other software development tools or frameworks. Similarly, schematic elements used to represent data or information may be implemented using any suitable electronic arrangement or data structure. Further, some connections, relationships or associations between elements may be simplified or not shown in the drawings so as not to obscure the disclosure.

This disclosure is to be considered as exemplary and not restrictive in character, and all changes and modifications that come within the guidelines of the disclosure are desired to be protected.

The invention claimed is:

1. A method for improving an accuracy of a computer system for object identification/classification through use of weakly supervised learning (WSL), the method comprising:
   (a) receiving at least one set of curated data, wherein the curated data includes labeled images;
   (b) using the curated data to train a WSL computer system including a deep network model for identifying objects within images, wherein the trained deep network model has a first accuracy level for identifying objects;
   (c) receiving a first target accuracy level for object identification by the WSL computer system;
   (d) determining, automatically via the computer system, an amount of weakly labeled data needed to train the WSL computer system to achieve the first target accuracy level; and
   (e) augmenting the WSL computer system using weakly supervised learning and the weakly labeled data to achieve the first target accuracy level for object identification by the deep network model.

2. The method of claim 1, wherein the weakly labeled data includes at least one of weakly labeled images or webly labeled images.

3. The method of claim 2, wherein the weakly supervised learning includes using a convolution layer to localize objects within images included in the weakly labeled data.

4. The method of claim 3, wherein the convolution layer is further used to predict labels for images included in the weakly labeled data.

5. The method of claim 3, wherein the convolution layer further analyzes each pixel of a feature map of an image included in the weakly labeled data, and generates a score for each class at each pixel.

6. The method of claim 1, wherein the deep network model includes discriminative weak localization with an average pooling layer.

7. The method of claim 1, further comprising:
   obtaining additional weakly labeled data; and
   classifying and locating objects within images included in the additional weakly labeled data using the augmented deep network model to achieve a first target accuracy level or a second target accuracy level for identifying objects.

8. The method of claim 1, further comprising:
   generating output by the WSL computer system, wherein the output includes at least one of image labels, object labels, features maps including the objects identified and their location within the images, class-wise scores, and class-wise score maps.

9. The method of claim 8, wherein the output generated by the WSL computer system is tested for accuracy and back propagation is performed on the WSL computer system to improve the accuracy and efficiency of the deep network model.

10. The method of claim 1, wherein the first target accuracy level varies based on a type of third party system that the WSL computer system is coupled to.

11. The method of claim 10, wherein the third party is one of a social media analytics application, a driver assistance system, a handicapped person assistance system, or an autonomous vehicle system.

12. A system comprising:
    a first interface for receiving at least one weakly labeled image;
    a weakly supervised learning (WSL) computer system implemented in one or more computers configured to analyze the at least one weakly labeled image using a deep network model and weakly supervised learning to determine a feature map of the at least one weakly labeled image, wherein the WSL computer system includes:
a pre-trained deep network model configured to analyze the at least one weakly labeled image;
a neural network layer configured to perform discriminative localization of objects within the at least one weakly labeled image, wherein performing discriminative localization of objects includes scoring each pixel within the at least one weakly labeled image;
a spatial pooling module configured to return class-wise scores for each of the at least one weakly labeled image; and
a loss function configured for use on the class-wise scores returned by the spatial pooling to compute cross-entropy loss for each of the at least one weakly labeled image.

13. The system of claim 12, wherein the system further includes a post processing system, and wherein the post processing system includes:
an accuracy estimation module configured to determine an accuracy of classification labels and/or feature maps created by the WSL computer system.

14. The system of claim 13, wherein the accuracy estimation module is configured to determine an amount of weakly labeled data that is required to reach a target accuracy level while minimizing an amount of curated data used.

15. The system of claim 14, wherein the accuracy estimation module further includes a controller that automatically retrieves additional weakly labeled data needed to obtain the target accuracy while minimizing the amount of curated data.

16. The system of claim 13, wherein the post processing system further includes a testing and back propagation module configured to verify the accuracy of the classification labels and feed them back into the WSL computer system to continually train the model and improve its performance and efficiency.

17. The system of claim 12, wherein the neural network layer is a Convolutional Neural Networks (CNN).

18. The system of claim 12, wherein the neural network layer is a Recurrent Neural Networks (RNN).

19. The system of claim 12, wherein the WSL computer system is either connected to or embedded in one of a social media analytics application, a driver assistance system, a handicapped person assistance system, or an autonomous vehicle system.

20. A method for improving accuracy of a computer system for object identification/classification through the use of weakly supervised learning, the method comprising:
(a) receiving at least one weakly labeled image;
(b) analyzing the at least one weakly labeled image using a deep network model and weakly supervised learning to determine a feature map of the at least one weakly labeled image;
(c) using a neural network layer to perform discriminative localization of objects within the at least one weakly labeled image, wherein performing discriminative localization of objects includes scoring each pixel within the at least one weakly labeled image;
(d) perform spatial pooling to return class-wise scores for each of the at least one weakly labeled image;
(e) using a loss function on the class-wise scores returned by the spatial pooling to compute cross-entropy loss for each of the at least one weakly labeled image; and
(f) determining a classification label for the at least one weakly labeled image based on at least one of the feature map, pixel scores, class-wise scores, and cross-entropy loss determined.

* * * * *